(12) United States Patent
Kim

(10) Patent No.: US 8,459,688 B2
(45) Date of Patent: Jun. 11, 2013

(54) PASSENGER AIR BAG APPARATUS FOR AUTOMOBILE

(75) Inventor: Hyun Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 114 days.

(21) Appl. No.: 13/084,307

(22) Filed: Apr. 11, 2011

(65) Prior Publication Data

US 2011/0248482 A1     Oct. 13, 2011

(30) Foreign Application Priority Data

Apr. 13, 2010   (KR) .......................... 10-2010-0033614

(51) Int. Cl.
*B60R 21/16*      (2006.01)

(52) U.S. Cl.
USPC ...................................... 280/728.3; 280/732

(58) Field of Classification Search
USPC .................... 280/728.3, 732, 728.1, 728.2
See application file for complete search history.

(56) References Cited

FOREIGN PATENT DOCUMENTS

| KR | 10-0698729 B1 | 3/2007 |
|----|---------------|--------|
| KR | 10-0974342 B1 | 8/2010 |

*Primary Examiner* — Eric Culbreth
(74) *Attorney, Agent, or Firm* — Morgan, Lewis & Bockius LLP

(57) ABSTRACT

A passenger air bag apparatus may include an air bag door, a chute positioned on both ends of the air bag door, wherein the chute has a first fitting hole in one end thereof and a second fitting hole in the other end thereof, and an air bag housing having a first hook received in the first fitting hole and a second hook received in the second fitting hole, wherein an air bag may be contained in the air bag housing, and wherein the first hook may be in contact with an edge of the first fitting hole, and the second hook may be not in contact with an edge of the second fitting hole.

9 Claims, 4 Drawing Sheets

PASSENGER AIR BAG APPARATUS FOR AUTOMOBILE

CROSS REFERENCE TO RELATED APPLICATION

The present application claims priority to Korean Patent Application Number 10-2010-0033614 filed on Apr. 13, 2010, the entire contents of which application are incorporated herein for all purposes by this reference.

BACKGROUND OF THE INVENTION

1. Field of the Invention

The present invention relates to a passenger air bag for an automobile, and more particularly, to a passenger air bag for an automobile, which an air bag can be deployed more efficiently.

2. Description of Related Art

An air bag for an automobile is disposed in front of the driver's seat or the seat next to the driver's seat such that it can instantaneously expand in the event of an automobile collision in order to protect the life or body of a driver or an occupant in the seat next to the driver's seat.

FIG. 1 shows the structure of a passenger air bag apparatus of the related art. An air bag module 3 and an air bag are installed in an air bag housing 2, which is provided inside a crash pad 1 in front of the seat next to the driver's seat of an automobile, and an air bag door 4 is disposed in front of the air bag and the air bag module 3.

The air bag door 4 includes a crash pad skin 4a, a door skin 4b, and a porous foam 4c disposed between the crash pad skin 4a and the door skin 4b. In the air bag apparatus configured as above, when an air bag operation signal is generated from an Electronic Control Unit (ECU) in the event of an automobile collision, an inflator disposed inside the air bag module 3 ignites explosion so that the air bag expands. In response to the expansion of the air bag, the door skin 4b and the crash pad skin 4a of the air bag door 4 are opened so that the air bag is inflated towards the seat next to the driver's seat, thereby protecting the body of an occupant in the seat next to the driver's seat.

A point of time when the air bag apparatus is intended to be inflated is a very important factor that guarantees the safety of the occupant. Since safety can be greatly influenced by the deployment time, it is necessary to precisely control the deployment time. In addition, it is required to develop a simple structure with which the air bag apparatus can be easily assembled.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention provide a passenger air bag apparatus, in which a point of time when an air bag is to be deployed can be precisely controlled.

Also provided is a passenger air bag apparatus, in which an air bag can be easily assembled.

In an aspect of the present invention, the passenger air bag apparatus may include an air bag door, a chute positioned on both ends of the air bag door, wherein the chute may have a first fitting hole in one end thereof and a second fitting hole in the other end thereof, and an air bag housing having a first hook received in the first fitting hole and a second hook received in the second fitting hole, wherein an air bag may be contained in the air bag housing, and wherein the first hook may be in contact with an edge of the first fitting hole, and the second hook may be not in contact with an edge of the second fitting hole.

The air bag door may have a tearing portion, which may be intended to be torn, wherein the tearing portion may be positioned closer to the second hook than to the first hook, wherein each of the first and second hooks may have a perpendicular section perpendicularly extending from the air bag housing and a parallel section substantially perpendicularly extending from the perpendicular section, and wherein the perpendicular section and the parallel section of the first hook may be in contact with the edge of the first fitting hole.

The parallel section extends away from the air bag door, wherein the first hook may have a protrusion on one end thereof, and wherein the protrusion may be seated in a seating recess formed near to the first fitting hole of the chute.

In another aspect of the present invention, the edge of the first fitting hole may include first and second edges wherein the first edge thereof may be disposed higher than the second edge thereof, and the edge of the second fitting hole may include first and second edges and wherein the first edge thereof may be disposed higher than the second edge thereof.

Each of the first and second hooks may have a perpendicular section perpendicularly extending from the air bag housing and a parallel section substantially perpendicularly extending from the perpendicular section, wherein the perpendicular section and the parallel section of the first hook may be in contact with the first and second edge of the first fitting hole.

The parallel section of the second hook may be in contact with the second edge of the first fitting hole but not the first edge thereof.

According to another aspect of the present invention, since one portion of the hook and the chute stay in contact with each other not only at the point of time when the air bag is deployed but also while the air bag is installed, it is possibly to deploy the air bag more stably compared to a structure in which the air bag can move freely inside the fitting hole.

In addition, thanks to the structure in which the hook of the air bag housing is fitted into the fitting hole, the air bag housing and the chute can be easily coupled to each other.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawings.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
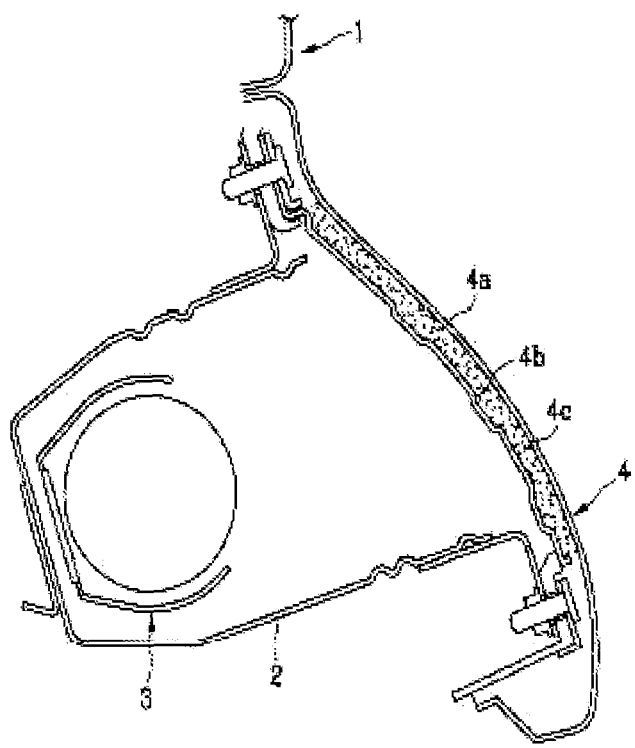
FIG. 1 is a cross-sectional view showing the structure of a passenger air bag apparatus of the related art.
Figure 2:
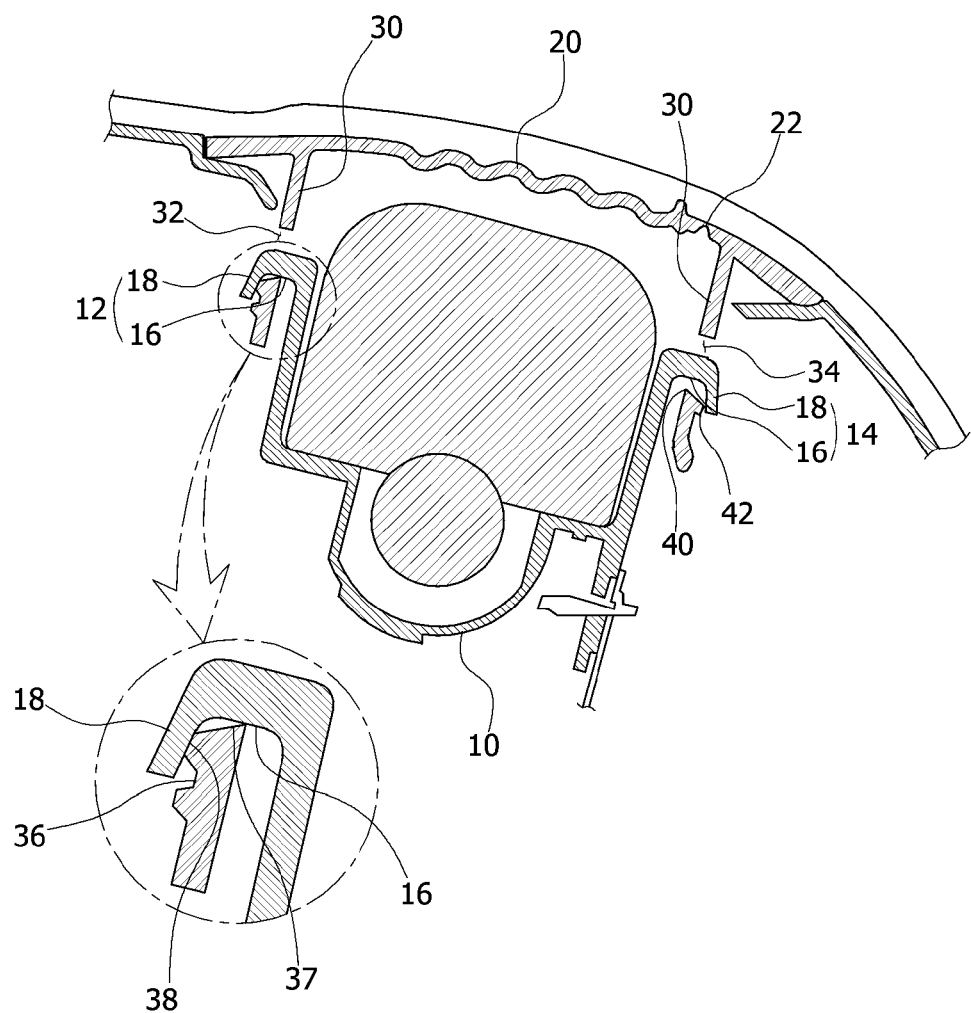
FIG. 2 is a cross-sectional view showing the structure of a passenger air bag apparatus according to an exemplary embodiment of the invention.

FIG. 2 is a cross-sectional view showing the structure of a passenger air bag apparatus according to an exemplary embodiment of the invention. A description will be made below with reference to FIG. 2.

In the passenger air bag apparatus of the present embodiment, an air bag door 20 is positioned opposite an occupant who is sitting in the seat next to the driver's seat. A chute 30 is fixed to both ends of the air bag door 20, and an air bag housing 10 is coupled to the chute 30 to contain an air bag therein.

A first fitting hole 32 is formed in one end of the chute 30, and a second fitting hole 34 is formed in the other end of the chute 30. The air bag housing 10 has a first hook 12, which is contained in the first fitting hole 32, and a second hook 14, which is contained in the second fitting hole 34. The first hook 12 and the second hook 14 of the air bag housing 10 are fitted into the first fitting hole 32 and the second fitting hole 34 of the chute 30, respectively, such that the air bag housing 10 can be coupled to the chute 30.

The air bag door 20 has a tearing portion 22, which is positioned closer to the second hook 14 than to the first hook 12. When the air bag is deployed, the tearing portion 22 is torn apart so that the air bag door 20 can rotate. As can be seen from FIG. 3, which will be described later, when the air bag is deployed, the air bag door 20 rotates in the direction towards the first hook 12, thereby forming a space, through which the air bag can be deployed.

In particular, it is preferred that the first hook 12 is in contact with edges 37 and 38 of the first fitting hole 32 and the second hook 14 is in contact with an edge 42 of the second fitting hole 34, not the edge 40 thereof. Specifically, in the present embodiment, the air bag housing 10 has an asymmetrical structure in which one end of the air bag housing 10 is in contact with one end of the chute 30 and the other end of the air bag housing 10 is not fully in contact with the other end of the chute 30.

In each of the first hook 12 and the second hook 14, a perpendicular section 16 perpendicularly extends from the air bag housing 10 and a parallel section 18 substantially perpendicularly extends again from the perpendicular section 16. Thus, the parallel section 18 can be oriented substantially parallel to the outer circumference of the air bag housing 10.

In addition, it is preferred that both the perpendicular section 16 and the parallel section 18 of the first hook 12 be in contact with the edges 37 and 38 of the first fitting hole 32. Here, the parallel section 18 extends away from the air bag door 20 such that the first hook 12 and the second hook 14 can have a substantially "U" shaped configuration. Specifically, the edges 37 and 38 of the first fitting hole 32 can be fixedly fitted into the area defined by the perpendicular and parallel sections 16 and 18. Alternatively, the edges 37 and 38 of the first fitting hole 32 can be fixed by interference fitting. In this case, the length of the perpendicular section 16 can be set to be the same as or smaller than the thickness of the chute 30 such that the edges 37 and 38 of the first fitting hole 32 can be interference fitted between the parallel section 18 and the air bag housing 10.

In addition, it is preferred that the parallel section 18 of the second hook 14 be in contact with the edge 42 of the second fitting hole 34 but the perpendicular section 16 thereof not be in contact with the edge 40 of the second fitting hole 34.

Figure 3:
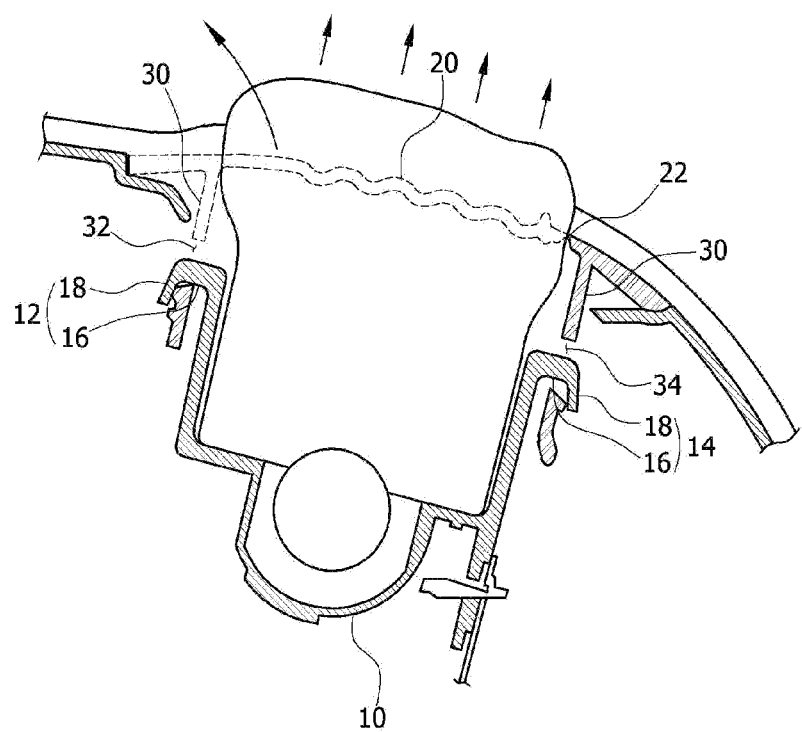
FIG. 3 is a view showing the deployment operation of the air bag shown in FIG. 2.

FIG. 3 is a view showing the deployment operation of the air bag shown in FIG. 2. A description is given below of the deployment operation of the air bag with reference to FIG. 3.

It is possible to suppose a case in which an air bag positioned in the seat next to the driver's seat is deployed in the event of an accident or intentionally by an occupant. Inflation gas is introduced into the air bag, which is then inflated.

At this time, the air bag expands in the inner space of the air bag door 20 and the air bag housing 10. An inflator, which supplies gas to the air bag, is omitted in order to simplify the figure. Since the first hook 12 and one end of the first fitting hole 32 stay in contact with each other, the space of the first fitting hole 32 is prevented from delaying the deployment of the air bag while the air bag is being deployed. If the first fitting hole 32 and the first hook 12 stay loose without coming into contact with each other, the air bag housing can be disposed as being sagged down within the size of the first fitting hole while the air bag is stored. In addition, while the air bag is being deployed, the deployment force of the air bag can be absorbed within the space of the first fitting hole. It becomes difficult for the air bag to expand while tearing the air bag door at a correct time.

As the air bag continues to expand and becomes greater than the inner space of the air bag housing 10, the tearing portion 22 is torn apart, and the air bag door 20 is rotated in the counterclockwise direction. Here, the direction is the same as the direction in which the first hook 12 is located. The air bag is deployed towards an occupant who is sitting in the seat next to the driver's seat.

Figure 4:
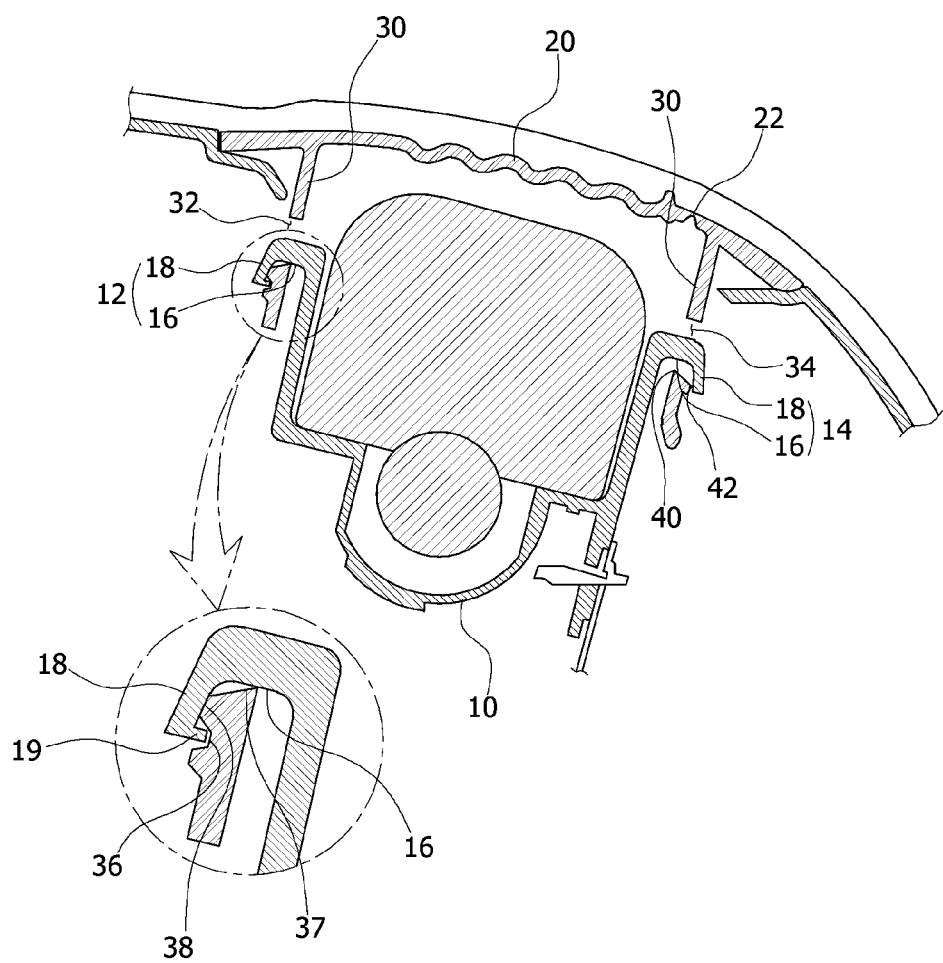
FIG. 4 is a cross-sectional view showing the structure of a passenger air bag apparatus according to another exemplary embodiment of the invention.

FIG. 4 is a cross-sectional view showing the structure of a passenger air bag apparatus according to another exemplary embodiment of the invention. The present exemplary embodiment will be described below with reference to FIG. 4. Since the present embodiment is substantially the same as the foregoing embodiment except that a protrusion 19 is provided in order to more stably fix the first hook 12 to the first fitting hole 32, a description is focused on the difference for the sake of explanation.

The protrusion 19 is formed on the distal end of the parallel section 18 of the first hook 12. The protrusion 19 can be seated in a seating recess 36, which is formed in one end of the chute 30. Since the shape of the protrusion 19 is the same as that of the seating recess 36, the protrusion 19 can be fitted into the seating recess 36.

In this case, the contact state between the first hook 12 and the first fitting hole 32 can be more stable compared to the foregoing embodiment.

According to exemplary embodiments of the present invention, since one portion of the hook and the chute stay in contact with each other not only at the point of time when the air bag is deployed but also while the air bag is installed, it is possibly to deploy the air bag more stably compared to a structure in which the air bag can move freely inside the fitting hole.

In addition, thanks to the structure in which the hook of the air bag housing is fitted into the fitting hole, the air bag housing and the chute can be easily coupled to each other.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof It is intended that the scope of the invention be defined by the Claims appended hereto and their equivalents.

What is claimed is:

1. A passenger air bag apparatus comprising:
an air bag door;
a chute positioned on both ends of the air bag door, wherein the chute has a first fitting hole in one end thereof and a second fitting hole in the other end thereof; and
an air bag housing having a first hook received in the first fitting hole and a second hook received in the second fitting hole;
wherein an air bag is contained in the air bag housing;
wherein the first hook is in contact with an edge of the first fitting hole, and the second hook is not in contact with an edge of the second fitting hole;
wherein the air bag door has a tearing portion, which is intended to be torn, wherein the tearing portion is positioned closer to the second hook than to the first hook;
wherein each of the first and second hooks has a perpendicular section perpendicularly extending from the air bag housing and a parallel section substantially perpendicularly extending from the perpendicular section;
wherein the perpendicular section and the parallel section of the first hook are in contact with the edge of the first fitting hole;
wherein the parallel section extends away from the air bag door; and
wherein the first hook has a protrusion on one end thereof, and wherein the protrusion is seated in a seating recess formed near to the first fitting hole of the chute.

2. The passenger air bag apparatus of claim 1, wherein the edge of the first fitting hole includes first and second edges wherein the first edge thereof is disposed higher than the second edge thereof, and the edge of the second fitting hole includes first and second edges and wherein the first edge thereof is disposed higher than the second edge thereof.

3. The passenger air bag apparatus of claim 2, wherein each of the first and second hooks has a perpendicular section perpendicularly extending from the air bag housing and a parallel section substantially perpendicularly extending from the perpendicular section, and
wherein the perpendicular section and the parallel section of the first hook are in contact with the first and second edge of the first fitting hole.

4. The passenger air bag apparatus of claim 2, wherein the parallel section of the second hook is in contact with the second edge of the first fitting hole but not the first edge thereof 5. A passenger air bag apparatus comprising:
an air bag door;
a chute positioned on both ends of the air bag door, wherein the chute has a first fitting hole in one end thereof and a second fitting hole in the other end thereof; and
an air bag housing having a first hook received in the first fitting hole and a second hook received in the second hook;
wherein an air bag is contained in the air bag housing;
wherein each of the first and second hooks has a perpendicular section perpendicularly extending from the air bag housing and a parallel section substantially perpendicularly extending from the perpendicular section; and
wherein the first hook has a protrusion on one end thereof, and wherein the protrusion is seated in a seating recess formed near to the first fitting hole of the chute.

6. The passenger air bag apparatus of claim 5, wherein the first hook is in contact with an edge of the first fitting hole, and the second hook is not in contact with an edge of the second fitting hole.

7. The passenger air bag apparatus of claim 6, wherein the edge of the first fitting hole includes first and second edges wherein the first edge thereof is disposed higher than the second edge thereof, and the edge of the second fitting hole includes first and second edges and wherein the first edge thereof is disposed higher than the second edge thereof.

8. The passenger air bag apparatus of claim 7, wherein the perpendicular section and the parallel section of the first hook are in contact with the first and second edges of the first fitting hole.

9. The passenger air bag apparatus of claim 7, wherein the parallel section of the second hook is in contact with the second edge of the first fitting hole but not the first edge thereof.

* * * * *